United States Patent [19]
Wojtyna

[11] 4,108,266
[45] Aug. 22, 1978

[54] BATTERY ENCLOSURE FOR A LIFT TRUCK

[75] Inventor: Elias Wojtyna, Strongsville, Ohio

[73] Assignee: Towmotor Corporation, Mentor, Ohio

[21] Appl. No.: 791,092

[22] Filed: Apr. 28, 1977

[51] Int. Cl.² ............................................. B62D 25/00
[52] U.S. Cl. .................................................. 180/68.5
[58] Field of Search ................... 180/68.5, 69; 296/63, 296/66; 312/293; 248/224, 309, 311

[56] References Cited
U.S. PATENT DOCUMENTS

| | | |
|---|---|---|
| 3,270,462 | 9/1966 | Obadal et al. ................... 180/69 UX |
| 3,275,092 | 9/1966 | Matthews ............................. 180/68.5 |
| 3,367,441 | 2/1968 | Schuster et al. ..................... 180/68.5 |
| 3,463,542 | 8/1969 | Daniels ........................... 180/68.5 X |

Primary Examiner—Robert R. Song
Assistant Examiner—Gene A. Church
Attorney, Agent, or Firm—Phillips, Moore, Weissenberger, Lempio & Majestic

[57] ABSTRACT

A lift truck includes a battery enclosure having upwardly extending wall means, and a top made up of first and second top portions which may be secured together with the top portions placed on the wall means to form such battery enclosure.

8 Claims, 5 Drawing Figures

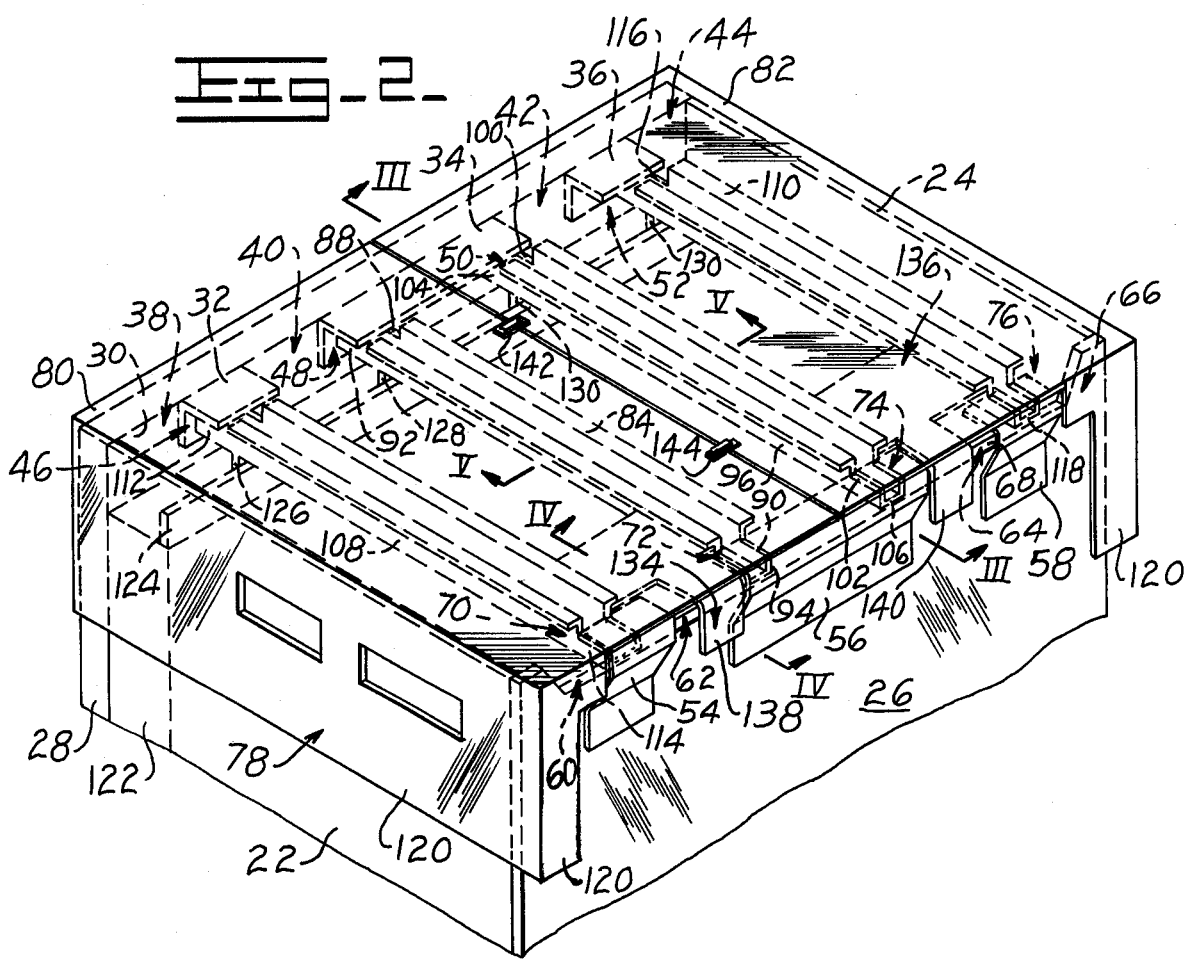
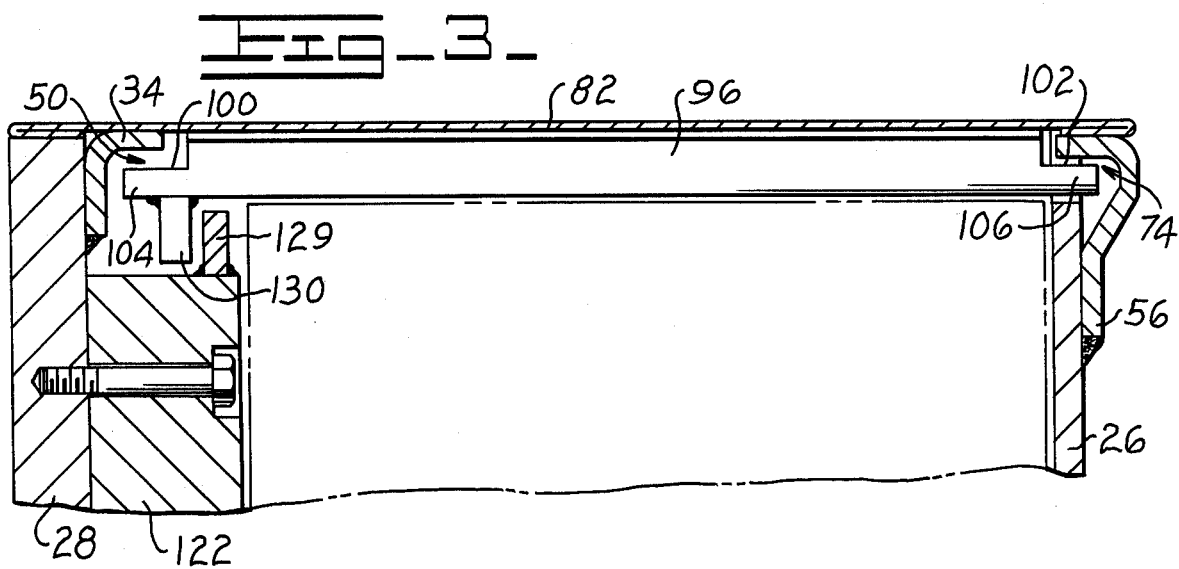

BATTERY ENCLOSURE FOR A LIFT TRUCK

BACKGROUND OF THE INVENTION

This invention relates to battery enclosures, and more particularly, to a top making up a portion of a battery enclosure of a vehicle.

In an electrically driven lift truck or the like, it is well known to provide a battery enclosure including upwardly extending walls, and a top, on which the operator's seat may be positioned. Access is provided to such batteries by moving the operator's seat and removing the top, so that the tops of the batteries are exposed.

It is to be understood that such batteries are relatively heavy and large in configuration. In the event that a vehicle is tipped over under disadvantageous working conditions, it is highly desirable that the battery enclosure retain the batteries therein. Thus, it is highly desirable that the top be secured to the wall means to provide that the overall enclosure retains the batteries therein. Yet, it will be understood that easy and convenient access to such batteries must be provided for maintenance thereof, through selective removal of the top of the enclosure.

SUMMARY OF THE INVENTION

The present invention is directed to overcoming one or more of the above problems.

In accordance with the present invention, such invention comprises a battery enclosure apparatus comprising wall means and a top comprising first and second top portions positionable on the wall means to form a battery enclosure. A plurality of tabs extend from each top portion, and means are included which define a plurality of recesses associated with the wall means, each tab being positionable in a recess with the top portions positioned on the wall means to form a battery enclosure, to prevent lifting of the top portion from the wall means. Each top portion is movable laterally of the wall means to positions wherein each top portion may be lifted from the wall means, and means are included for selectively securing the top portions together with the top portions in position on the wall means to form a battery enclosure.

BRIEF DESCRIPTION OF THE DRAWINGS

Other objects of the invention will become apparent from a study of the following specification and drawings, in which:

FIG. 2 is a perspective view of the battery enclosure of the present invention;

FIG. 3 is a sectional view taken along the line III—III of FIG. 2;

DESCRIPTION OF THE PREFERRED EMBODIMENT

Figure 1:
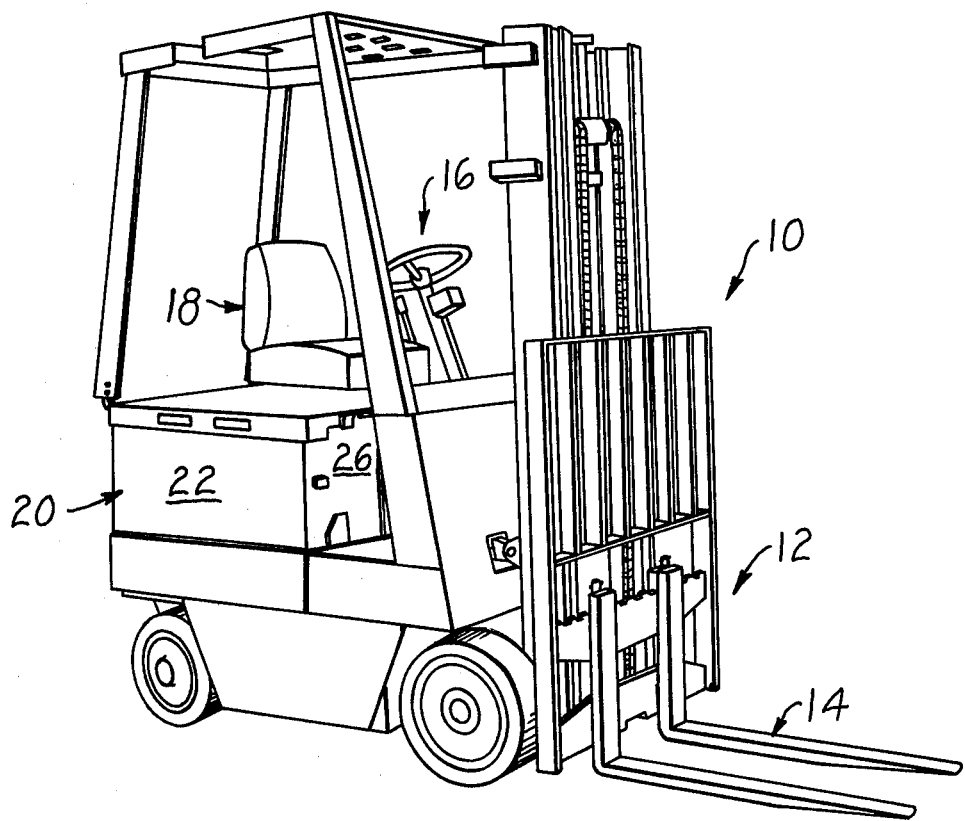
FIG. 1 is a perspective view of a lift truck incorporating the present invention.
Figure 4:
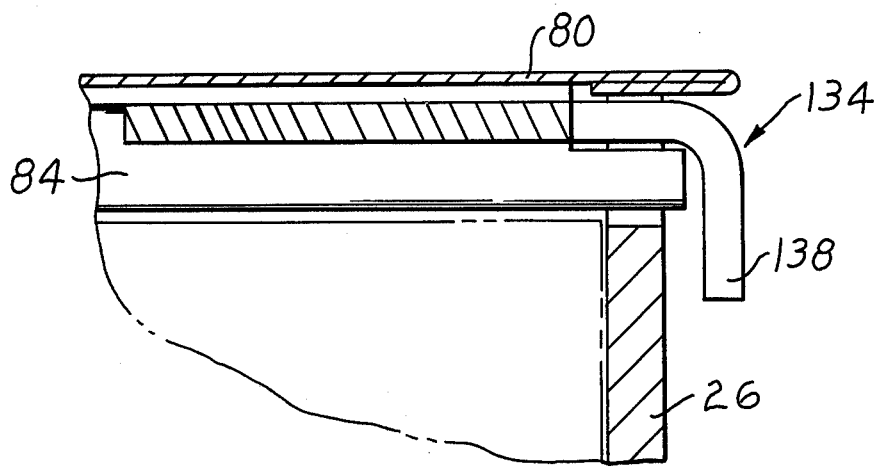
FIG. 4 is a sectional view taken along the line IV—IV of FIG. 2.

Shown in FIG. 1 is an electrically driven lift truck 10 of the type including a front lift apparatus 12 including a fork 14, and an operator's station 16 including a seat 18 positioned on a battery enclosure 20 in which the batteries of the vehicle 10 are contained. The battery enclosure 20 includes opposite upwardly extending walls 22, 24 secured to opposite upwardly extending walls 26, 28. The walls 22, 24, 26, 28 are generally vertical in relation to the overall positioning of the vehicle 10. The top portion of the wall 28, which is actually the rear wall of the enclosure, has fixed thereto on the inner surface 30 thereof projecting members 32, 34, 36, spaced apart so as to define open portions 38, 40, 42, 44 as shown. The projecting members define recesses 46, 48, 50, 52 immediately thereunder, the utility of which will be described further on.

Fixed to the outer surface of the wall 26, which is actually the front wall of the enclosure 20, are retaining members 54, 56, 58, positioned in correspondence with the positioning of the projecting members 32, 34, 36, so as to define similar openings 60, 62, 64, 66, adjacent thereto. The retaining members 54, 56, 58 form with the top surface 68 of the wall 26 recesses 70, 72, 74, 76, each recess associated with the wall 26 being generally aligned with a recess associated with the back wall 28.

Figure 5:
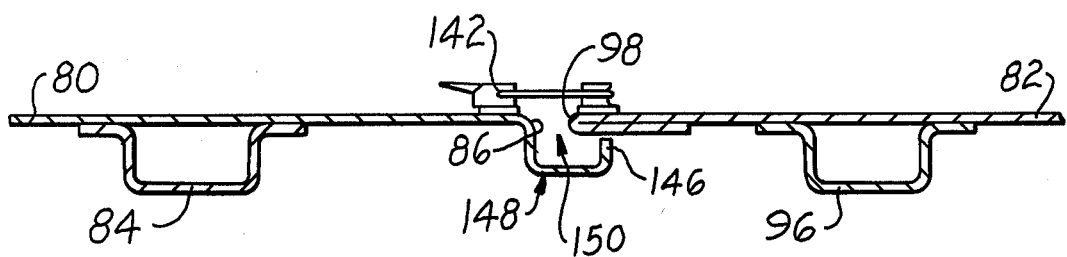
FIG. 5 is a sectional view taken along the line V—V of FIG. 2.

The battery enclosure also includes a top 78 made up of top portions 80, 82. An elongated generally U-shaped member 84 (FIG. 5) is secured to the top portion 80 adjacent one edge 86 thereof, running from front to back of the top portion 80. The generally U-shaped member 84 has cutouts 88, 90 adjacent the ends thereof so as to define oppositely extending tabs 92, 94 extending from that top portion 80. Similarly, an elongated generally U-shaped member 96 is fixed to the top portion 82 adjacent one edge 98 thereof (FIG. 5), running from the front to the back of the top portion 82, the generally U-shaped member 86 also having cutouts 100, 102 so as to define oppositely extending tabs 104, 106 extending from the top portion 82. Generally similar elongated U-shaped members 108, 110 are secured to the top portions 80, 82 as shown, defining tabs 112, 114, 116, 118 in the same manner. The top portions 80, 82 define downwardly extending flanges 120 about the edges thereof, which partially surround the upper portions of the walls 22, 24, 26, 28 with the top portions 80, 82 in position as shown in FIGS. 1-4 on the walls 22, 24, 26, 28 to form a battery enclosure 20.

The rear wall 28 is fixed to a plate 122 welded to the frame. First additional tab means in the form of an elongated single bar 124 is secured to the plate 122 so as to be secured relative to the walls 22, 24, 26, 28. Such bar 124 extends generally the full width of the battery enclosure 20, and extends toward the top 78 with the top portions 80, 82 positioned as shown in FIGS. 1-4. The generally U-shaped members 84, 96, 108, 110 have secured thereto second additional tab means in the form of individual bars 126, 128, 130, 132, each extending downwardly from the top 78, adjacent the bar 124 with the top portions 80, 82 in position on the walls 22, 24, 26, 28. Bracket means in the form of brackets 134, 136 are included, the bracket 134 being secured to the generally U-shaped members, and the bracket 136 being secured to the generally U-shaped members. The brackets 134, 136 include respective bracket portions 138, 140 extending beyond the top 78 and adjacent the outer surface of the wall 26, with the top portions 80, 82 in position on the walls 22, 24, 26, 28.

With the top portions 80, 82 positioned as shown in FIGS. 1-4 each tab is positioned in a recess. With the top portions 80, 82 so positioned, releasable latch means 142, 144 are actuated for selectively securing the top portions 80, 82 together. With the apparatus thus far described, and in position as shown in FIGS. 1-4, the top portions 80, 82 cannot be lifted from the walls 22, 24, 26, 28 because the tabs interact with the projecting members 32, 34, 36 and retaining members 54, 56, 68 to prevent such lifting. Similarly, because the latch means 142, 144 secure the top portions 80, 82 together, the flanges 120 prevent lateral movement of the top portions 80, 82 relative to the walls 22, 24, 26, 28.

Additionally, it should be noted that the bar 124 and bars 126, 128, 130, 132 are positioned to limit movement of the top portions 80, 82 in one sideward direction relative to the lateral movement thereof which would allow lifting of the top portions 80, 82 through contact of the bar 124 and bars 126, 128, 130, 132. Furthermore, the bracket means 134, 136 are positioned relative to the wall 26 to contact such wall 26 to limit movement of the top portions 80, 82 in an opposite sideward direction relative to the lateral movement allowing lifting of the top portions 80, 82.

With the parts positioned as thus far described, it should be noted that the top portion includes an extension 146 which forms a gutter 148 positioned beneath the adjacent edges 86, 98 of the top portions 80, 82, these edges 86, 98 defining a small gap 150 therebetween. In the event that, for example, rain falls on the top 78 of the battery enclosure 20, the rain will not be allowed to reach the batteries, but will be led off toward the front or rear wall 26 or 28 of the enclosure, such gutter 150 generally spanning the enclosure between the front and rear walls 26, 28.

If access to the battery is needed, the latches 140, 142 are actuated to provide disconnnection of the top portion and the top portion 82. The top portion 80 may then be moved laterally to move the tabs 92, 112 into openings 40, 38, and the tabs 94, 114 into openings 62, 60, whereby the top portion 80 may be lifted from the walls. The top portion 82, of course, may be removed through lateral movement thereof in a similar manner.

In order to re-install the top portions 80, 82 on the walls 22, 24, 26, 28, the reverse operation takes place.

It will be seen that top 78 made up of top portions 80, 82 secured in position in accordance with the above description and as shown in FIGS. 1–5 serves to safely retain batteries in the enclosure, even in the event that the machine is turned on its side.

The embodiments of the invention in which an exclusive property or privilege is claimed are defined as follows:

1. A battery enclosure apparatus comprising:
   wall means;
   a top comprising first and second top portions positionable on the wall means to form a battery enclosure;
   a plurality of tabs extending from each top portion;
   means defining a plurality of recesses associated with the wall means, each tab being positionable in a recess with the top portions positioned on the wall means to form a battery enclosure, to prevent lifting of the top portions from the wall means;
   each top portion being movable laterally of the wall means to move the tabs thereof to positions relative to the wall means wherein each top portion may be lifted from the wall means;
   means for selectively securing the first top portion together with the second top portion in position on the wall means to form a battery enclosure; and
   first additional tab means secured relative to the wall means and extending toward the top, and second additional tab means secured to at least one of the first and second top portions and positioned relative to the first additional tab means, with the top portion in position on the wall means, to limit movement of the one top portion in a sideward direction relative to the lateral movement thereof allowing lifting of that top portion.

2. The apparatus of claim 1 and further comprising bracket means secured relative to a top portion and positioned relative to the wall means, with that top portion positioned on the wall means, to limit movement of that top portion in a sideward direction relative to the lateral movement thereof allowing lifting of that top portion.

3. The apparatus of claim 2 wherein the first additional tab means comprise a single bar fixed relative to the wall means, and wherein the second additional tab means comprise a plurality of individual bars secured relative to that top portion.

4. A battery enclosure apparatus comprising:
   stationary wall means for rigidly walling a battery when placed therein, the wall means defining a first pair of opposed walls secured to a second pair of opposed walls;
   a top comprising first and second top portions normally positioned on the wall means to form a battery enclosure;
   a plurality of tabs extending from the top portions, the tabs extending toward the first pair of walls when the top portions are normally positioned;
   means defining a plurality of recesses on the first pair of walls, each recess for receiving a respective tab when the top portions are normally positioned to prevent lifting of the top portions from the wall means, each top portion being movable laterally with respect to the second pair of walls wherein each top portion may be lifted from the wall means; and
   means for selectively securing the first top portion with the second top portion to form a battery enclosure.

5. The apparatus of claim 4 wherein each top portion defines downwardly extending flange means exterior the wall means, the flange means partially surrounding the upper portion of the wall means for limiting lateral movement of the top portions when the top portions are selectively secured.

6. The apparatus of claim 4 wherein the selective securing means comprises releasable latch means.

7. The apparatus of claim 4 further comprising bracket means secured to the top portions and extending downward exterior the wall means for limiting sideward movement of the top portions with respect to the lateral movement which allows lifting the top portions.

8. The apparatus of claim 4 further comprising a gutter member positioned under the area where the top portions are adjacent each other when normally positioned, the gutter member spanning the distance between the first pair of walls.

* * * * *